United States Patent [19]

Markwitz

[11] Patent Number: 4,578,532
[45] Date of Patent: Mar. 25, 1986

[54] METHOD AND APPARATUS FOR CODE TRANSMISSION

[75] Inventor: Wernhard Markwitz, Munich, Fed. Rep. of Germany

[73] Assignee: Siemens Aktiengesellschaft, Berlin & Munich, Fed. Rep. of Germany

[21] Appl. No.: 384,235

[22] Filed: Jun. 2, 1982

[30] Foreign Application Priority Data

Jun. 11, 1981 [DE] Fed. Rep. of Germany ....... 3123168

[51] Int. Cl.$^4$ .............................................. H04L 9/04
[52] U.S. Cl. ............................. 178/22.13; 178/22.14; 178/22.17
[58] Field of Search ............... 178/22.09, 22.13, 22.14, 178/22.15, 22.16, 22.17; 1179/1.5 E

[56] References Cited

U.S. PATENT DOCUMENTS

| | | | |
|---|---|---|---|
| 4,193,131 | 3/1980 | Lennon et al. | 178/22.09 |
| 4,203,166 | 5/1980 | Ehrsam et al. | 178/22.09 |
| 4,211,891 | 7/1980 | Glitz | 178/22.17 |
| 4,386,234 | 5/1983 | Ehrsam et al. | 178/22.09 |
| 4,458,109 | 7/1984 | Mueller-Schloer | 178/22.08 |

FOREIGN PATENT DOCUMENTS 0063332 10/1982 European Pat. Off. ......... 178/22.13

Primary Examiner—Salvatore Cangialosi
Attorney, Agent, or Firm—Hill, Van Santen, Steadman & Simpson

[57] ABSTRACT

A transmission code required for decoding an encoded transmission of messages between a transmitting station and a receiving station is first transmitted from one station to the other. Previously identified passwords are used to encode the transmission code, by the transmitting station, together with a transmission station code. At the receiving station, a code signal is decoded with the password and reencoded with a receiving station code and with an additional password. The transmitting station receives the encoded acknowledgement from the receiving station, decodes the acknowledgement using the second password, and its own station code, and reencodes it with a third password, transmitting the result back to the receiving station. The receiving station extracts the transmission code from the second transmission from the transmitting station, by decoding it with the receiving station's station code and the third password.

6 Claims, 3 Drawing Figures

METHOD AND APPARATUS FOR CODE TRANSMISSION

BACKGROUND OF THE INVENTION

1. Field of the Invention:

The present invention relates to a method of code transmission, and more particularly, to such a method in which a code is agreed upon in advance between the transmitting and receiving stations, having corresponding ciphering machines for the transmission and reception of encoded messages.

2. The Prior Art:

It is generally known to provide cipher machines at transmitting and receiving stations, for the transmission and reception of encoded messages. At the transmitting station, messages from a terminal are encoded by means of a cipher machine and fed to a long distance line by a transmission unit. At the receiving station, messages are received and decoded, employing a corresponding cipher machine, and fed to a receiving terminal. The transmitting and receiving units may be interconnected either by a dedicated connection, or by a network such as a dial switching network or the like.

Such stations are able to carry on communication by means of clear transmission, that is, messages which are not coded with any special code, but encoded transmissions are preferred when secrecy is desired, in order to make it more difficult for third parties to become cognizant of the message. The code necessary for such a transmission can be agreed upon in advance, however, there is no normal means of insuring that the transmission is taking place with the desired station.

BRIEF DESCRIPTION OF THE INVENTION

It is a principal object of the present invention to provide a method and apparatus for assuring that messages are transmitted only to desired stations.

This object is achieved in the present invention by means of the following steps:

A. The transmitting station encodes the transmission code to be used with its own station code and with a first secret password known to the transmitting and receiving stations, and transmits the result to the receiving station.

B. The receiving station decodes the transmission, using the first secret word, and encodes it with its own station code and a second secret word known to both stations, returning the result to the transmitting station.

C. The transmitting station decodes the transmission from the receiving station, using the second secret word and its own station code, and encodes it further with a third secret word known to the two stations and transmits the result to the receiving station.

D. The receiving station decodes the data, using the third secret word and its own station code, and thus obtains the code.

The method of the present invention achieves the advantage that a protected transmission of codes between the stations can take place in a simple manner and without the requirement of a general distribution of the codes, so that it becomes very difficult for third parties to obtain knowledge of the codes which are used. The only advance requirement is the agreement upon the secret words at both stations.

The security of the code transmissions further increases when a fourth secret word is used, such word being used at the transmitting station for encoding the transmission code, before encoding with its own station code, such fourth secret word being decoded at the receiving station after decoding the transmission with its own station code.

BRIEF DESCRIPTION OF THE DRAWINGS

Reference will now be made to the accompanying drawings in which.

DESCRIPTION OF THE PREFERRED EMBODIMENTS

Figures 1, 2:
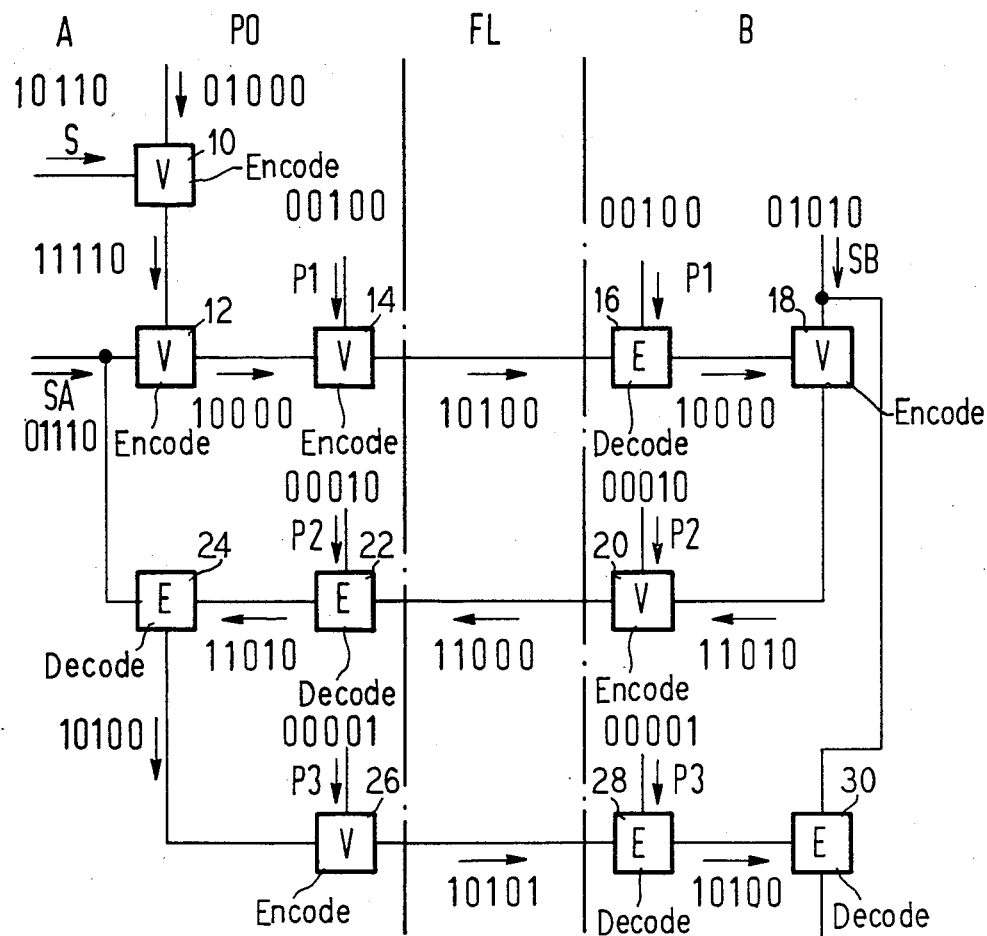
FIG. 1 is a block diagram of apparatus incorporating the present invention.
FIG. 2 is a functional block diagram illustrating the steps followed in the method of the present invention.

Referring now to FIG. 1, messages, such as data and the like, are transmitted from a transmitting station A to a receiving station B. The messages either originate with, or pass through, a data terminal DE1, and are fed to a cipher machine SG1 as data to be transmitted SD1. The cipher machine SG1 encodes the message and transmits it over a transmission unit U1 and a long distance line FL to a transmission unit U2 of the receiving station B. There, the encoded message is fed to a cipher machine SG2, which decodes it and feeds it to a data terminal DE2 in the form of a received message ED2. For the message transmitted in the reverse direction, the message is fed from the data terminal DE2 in the form of a message to be transmitted SD2, which is encoded in the cipher machine SG2. The encoded message is transmitted over the long distance line FL and is decoded in the cipher machine SG1 and fed to the data terminal DE1 in the form of a received message ED1.

The encoding and decoding of data and messages in the cipher machines SG1 and SG2 requires the employment of a key or code which is employed to program operation of the cipher machines SG1 and SG2. The same key can be employed for transmission in both directions, or alternatively, different keys can be agreed upon for transmission in the two opposite directions. In the following discussion, in the interest of simplicity, it is assumed that a message is transmitted only from the transmitting station A to the receiving station B.

At the station A, a random generator (not shown) within the cipher machine SG1, generates the current code or key, as well as the station code SA. The subsequently transmitted data are to be encoded using the current code or key. The current code or key is transmitted to the receiving station B, using secret words or passwords known to both stations, which words are stored in the memories of the cipher machines SG1 and SG2.

FIG. 2 illustrates the sequence of operations in initiating the transmission between stations A and B. The individual encoding and decoding operations which are carried on at the stations A and B are illustrated with blocks labelled with V or E. The V blocks perform an encoding function using the transmission code or key, the station code, and the secret words, and the E blocks operate to decode the previously encoded messages, using the station codes and the secret words. As illustrated in FIG. 2, the encoding and decoding takes place by means of binary addition and subtraction.

In the arrangement illustrated in FIG. 2, four passwords are employed for coding, identified as P0, P1, P2 and P3. These passwords or secret words P0 through P3 are known to both stations before the transmission of the code. When the cipher machine SG1 generates a current transmission code or key S, and a temporary station code SA, the code S is first encoded with the password P0 in a binary adder 10. In the example illustrated in FIG. 2, the transmission code S is 10110, and the first password P0 is 01000. The sum is 11110, which is passed to an encoder unit 12, where the temporary station code SA is combined with it, by binary subtraction. The difference is then passed to an encoder unit 14, where the first password P1 is combined with the difference by binary addition, after which the new sum is transmitted to the station B over the long distance line FL.

At the station B, a decoding unit 16, decodes the transmission by subtracting therefrom the password P1, and the difference is supplied to an encoding unit 18 which encodes the input with the temporary station code SB generated by the cipher machine SG2. This sum is then combined with the second password P2, in an encoding unit 20 (by binary subtraction), and the result transmitted back to the station A. At the station A, the password P2 is cancelled from the message by binary subtraction in a decoding unit 22, after which the decoding unit 24 removes the temporary station code SA by means of binary addition. This new sum is connected to a further encoding unit 26, which encodes the data with the third password P3, and transmits the result to the receiving station B. At station B, the influence of the password P3 is removed by the decoding unit 28, after which the decoding unit 30 removes the effect of the temporary station code SB, and finally the decoding unit 32 removes the initial password P0, yielding the transmission code or key S. This transmission code then becomes available at the station B, and an encoded transmission of messages from station A to station B can be commenced using the same transmission code or key S at both stations.

When it is desired to transmit data in both directions, the operation is repeated in the reverse direction, and a different transmission code or key may be employed for transmission in the reverse direction. In such a case, the station B produces the further code, preferably by means of a random number generator. It is possible to employ the same passwords P0 through P3 for decoding the reverse transmission code, or alternatively, further passwords may be used for the encoding and decoding of the further reverse transmission code. It is also possible to transmit the forward and reverse transmission codes simultaneously in both directions. In this case, the only thing required is a further transmission from the station B to the station A, so that the reverse transmission code or key can be made known to station A. For example, if the reverse transmission code is encoded with the output from the decoding unit 30, by binary addition, and transmitted to the station A, the reverse transmission code can be recovered at the station A by the successive binary subtraction of the password P0 and the forward transmission code S.

After the exchange of codes between the stations A and B, and a following transmission of encoded messages and/or data, new codes for further transmissions in one or both directions, with or without passwords, can be transmitted, employing the current transmission code or key. Subsequent transmissions of transmission codes or keys may take place using the old passwords for the newly transmitted passwords.

Before transmitting transmission codes, with the assistance of passwords, it is also possible to employ physically distributed codes for the first exchange of messages. Apparatus and methods using the physically distributed codes are well known, and therefore, need not be described in detail. When the transmission using such physically distributed codes is sufficiently protected, the exchange of transmission codes using passwords can be commenced, so that subsequent messages can enjoy the greater security afforded by the use of the present invention.

The use of physically distributed, device-associated codes is advantageously used in cases where passwords are not agreed upon between two stations in advance. In such a case, the physically distributed codes can be used to establish a two-way transmission between the two stations, for completing the test operation, or the exchange of less important messages.

The security of transmissions is increased further, when, after transmission of transmission codes or keys by means of passwords, further randomly generated transmission codes are transmitted, using passwords, and also using the previously transmitted current transmission code.

It is also advantageous to use separate transmission codes for messages transmitted in the two different directions. The same or different passwords can be agreed upon for communication of the appropriate transmission codes to each station.

Figure 3:
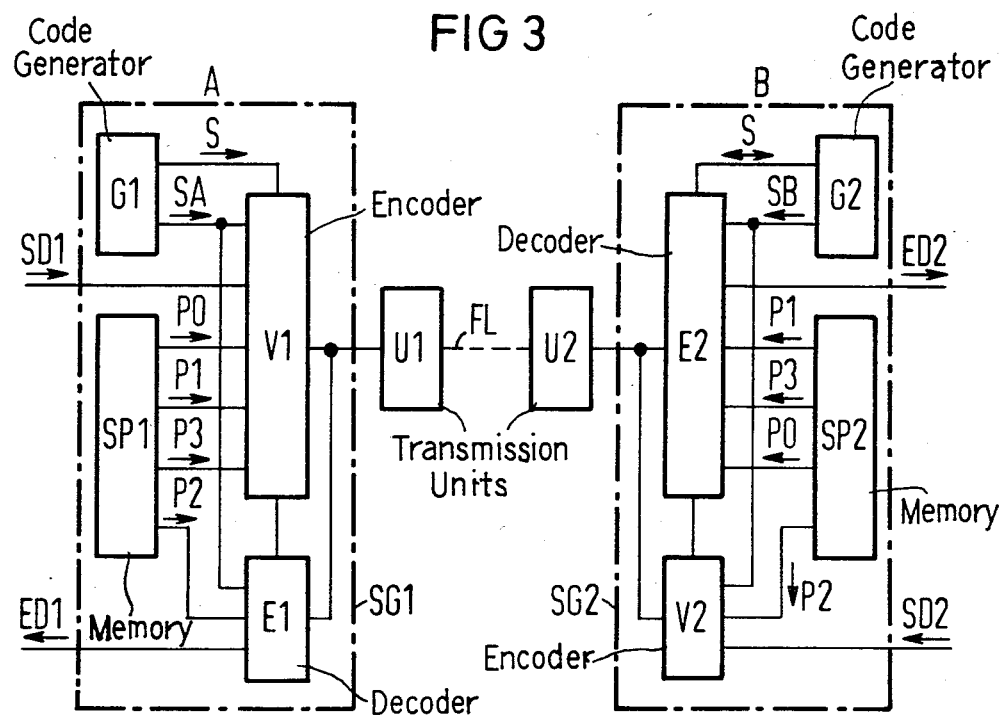
FIG. 3 is a functional block diagram of apparatus which may be used in an illustrative embodiment of the present invention.

FIG. 3 illustrates an apparatus which represents the portions of the cipher machines SG1 and SG2 which are required for carrying out the transmission of a code from station A to station B. The passwords P0 through P3 are stored in the memories SP1 and SP2, in each cipher machine. Each cipher machine contains a code generator G1 and G2, respectively, for generating and storing the temporary codes SA and SB, respectively. As described above, these codes are preferably generated by a random generator. The transmission code S is generated and stored in the code generator G1 and is also stored (after decoding) in the generator G2.

As illustrated in FIG. 2, the transmission code S is encoded with the password P0, the station code SA, and the password P1 in an encoding station V1. The resulting cryptogram is transmitted over the transmission unit U1 and the long distance line FL to the receiving transmission unit U2 and the cipher machine SG2. A decoding stage E2 decodes the cryptogram of the password P1, and subsequently encodes the result in an encoding stage V2 with the station code SB and the password P2. This new cryptogram is transmitted over the long distance line FL and is decoded in the decoding stage E1 of the cipher machine SG1, which cancels the influence of the password P2, and decodes the remainder of the station code SA, subsequently returning it to the station B encoded with the password P3. There, the decoding stage E2 decodes the new cryptogram of the password P3, the station code SB, and the password P0, and in this manner derives the code S which is intermediately stored in the code generator G2. Subsequently a transmission of a message or data SD1 can be commenced, encoded with the transmission code S in the encoder stage V1, and decoded in the decoding stage E2 with the same stored transmission code S, so that the message is produced as a decoded received message ED2. In the case in which the same transmission code is used for transmission of data in the reverse direction, the message or data SD2 to be supplied in the reverse direction is fed to the encoding stage V2, encoded with the transmission code S, and forwarded to the station A over the line FL. The reverse message and data are decoded in the decoding stage E1, using the transmission code S, and produced as received message ED1.

From the foregoing, it will be seen that use of the present invention affords great security in the transmission of private messages and data. When the appropriate passwords are known only to the stations with which it is desired to communicate, proper reception by the intended station is confirmed in the use of the present invention, either by analysis of the encoded signals received from the communicating station, or simply from the fact that knowledge of the proper passwords is needed to yield the necessary transmission code S. Also, when the station codes being used by each station are known to the other, the identity of the transmitting and receiving stations may be determined, if desired, by analysis of received encoded signals.

While the invention has been described above in terms of binary addition and subtraction (the latter being merely addition with opposite sign), it will be appreciated that other means of combining the various codes may be used, so long as an inverse function is available for the purpose of decoding.

It will be apparent that various other modifications and additions may be made in the apparatus and method of the present invention without departing from the essential features of novelty thereof, which are intended to be defined and secured by the appended claims.

I claim as my invention:

1. A method for establishing a transmission code simultaneously at a transmitting and a receiving station for the encoded subsequent transmission of messages, each of said stations having cipher machines for producing a station code individual to said station, comprising the steps of:

encoding the transmission code at the transmitting station with the transmitting station code and a first password and a fourth password known to both stations;

transmitting the encoded result from the transmitting station to the receiving station;

decoding the result at the receiving station using said first password, and encoding the result of such decoding with the station code of said receiving station and a second password;

transmitting the new encoded result back to the transmitting station;

decoding the transmission at the transmitting station using said second password and the said station code of the transmitting station;

encoding the decoded result with a third password and trasmitting the newly encoded result to the receiving station; and decoding the trasmission at the receiving station with said third passwod and said forth password and the station code of said receiving station in order to derive the transmission code.

2. The method according to claim 1, including the step of using a physically distributed device associated code to transmit a transmission code prior to the use of said passwords.

3. The method according to claim 1, including the step of transmitting a further transmission code, using said passwords, by means of a previously transmitted transmission code and said passwords.

4. The method according to claim 3, including the step of using a preceding transmission code to transmit a subsequent transmission code.

5. The method according to claim 1, including the steps of using separate transmission codes for two-way transmission in forward and reverse directions between said transmitting and receiving stations.

6. The method according to claim 5, including the step of employing the same passwords at said transmitting and receiving stations for the transmission of said separate transmission codes.

* * * * *